(12) United States Patent
Walters

(10) Patent No.: US 10,264,774 B2
(45) Date of Patent: Apr. 23, 2019

(54) LINE KNOT TYING APPARATUS

(71) Applicant: Jim Walters, Denver, CO (US)

(72) Inventor: Jim Walters, Denver, CO (US)

( * ) Notice: Subject to any disclaimer, the term of this patent is extended or adjusted under 35 U.S.C. 154(b) by 292 days.

(21) Appl. No.: 15/355,045

(22) Filed: Nov. 17, 2016

(65) Prior Publication Data
US 2018/0132466 A1 May 17, 2018

(51) Int. Cl.
*A01K 91/047* (2006.01)
*A01K 91/04* (2006.01)

(52) U.S. Cl.
CPC ............ *A01K 91/047* (2013.01); *A01K 91/04* (2013.01)

(58) Field of Classification Search
CPC ....... A01K 91/047; A01K 91/04; B65H 69/04
USPC ........................................................ 289/17
See application file for complete search history.

(56) References Cited

U.S. PATENT DOCUMENTS

| | | | |
|---|---|---|---|
| 2,783,571 A | 3/1957 | Stilwell | |
| 2,825,592 A | 3/1958 | Semple | |
| 2,843,961 A | 7/1958 | Semple | |
| 3,169,787 A | 2/1965 | Zolezzi | |
| 3,881,757 A | 5/1975 | Guinther | |
| 5,536,273 A * | 7/1996 | Lehrer | A61B 17/0483 289/1.5 |
| 5,662,666 A * | 9/1997 | Onuki | A61B 17/0483 112/169 |
| 5,791,699 A * | 8/1998 | High | D03J 3/00 289/17 |
| 5,951,067 A * | 9/1999 | High | D03J 3/00 289/17 |
| D452,420 S * | 12/2001 | Johnston | D8/14 |
| 6,375,171 B1 * | 4/2002 | Zimmermann | B25F 5/006 267/137 |
| 6,550,177 B1 * | 4/2003 | Epple, Jr. | A01K 97/26 289/17 |
| 7,419,195 B1 * | 9/2008 | Jochum | D03J 3/00 289/17 |
| 7,883,122 B2 * | 2/2011 | Orko | B65H 69/043 289/17 |
| 8,608,211 B1 * | 12/2013 | Jarvis | B65H 69/04 289/1.5 |

(Continued)

OTHER PUBLICATIONS

Jim Walters, EZ Tie Product Website, Home Page with ordering and Method of Use Page with ordering, date of first going public is Dec. 20, 2012. Website address is www.eztiesystem.com for reference.

*Primary Examiner* — Shaun R Hurley

(57) ABSTRACT

A line knot tying apparatus and method of use is disclosed that assists in joining first and second line free end portions. The knot tying apparatus includes a housing with an aperture therethrough that is slidably engaged to an extension element wherein an element biases the extension to a closed state that can be manually pushed into an open state. Also a helical coil with continuously increasing pitch line distance is attached to the housing. Operationally the first and second line free end portions each have a manual removable slidable engagement to the helical coil with opposing free ends that are wound in a plurality of loops about the opposing line then being secured by the extension element in the closed state. Then manually pulling the non free end line portions apart from one another to form the knot, further releasing the opposing line free ends from the extension element.

9 Claims, 16 Drawing Sheets

(56) References Cited

U.S. PATENT DOCUMENTS

2015/0129077 A1\* 5/2015 Wright .................. D03D 29/00
139/33

\* cited by examiner

LINE KNOT TYING APPARATUS

TECHNICAL FIELD

The present invention relates generally to an apparatus, which is employed to assist in tying a knot in a flexible line, as the knot essentially ties together two separate flexible lines to one another. More particularly, the present invention of the line knot tying apparatus facilitates the easy and fast connection of two separate fishing lines to one another utilizing a blood or barrel knot that has the advantages of being slip free, avoiding kinking the line that could cause a stress/break point in the line, wherein also the tied blood knot resulting in an outer surface that has a relatively smooth outer profile that minimizes the opportunity for the tied blood knot to get "hung up" on other portions of fishing line equipment, such as rod eyes/guides. As the blood knot is relatively difficult to tie with an individual's manually bare hands, the present invention helps to make tying blood knots relatively easy while accommodating different line diameters.

BACKGROUND OF INVENTION

In many types of fishing there is a need to linearly connect various sections of fishing line, either because of different properties of each line section, such as test tensile strength, materials of construction for the line, various articles to attach to the line, or to repair a line break such as snagging on the water bottom or cutting/chaffing the line on sharp hard objects in or out of the water. Thus, the need to re-attach separate fishing line sections to one another is required quite often for the reasons stated above, thus being able to conveniently tie the fishing line is highly desirable. However, not just any knot will do, as fish line typically has a smooth slick surface and is constructed of a synthetic polymer such as nylon having a monofilament structural construction, having the desirable qualities of course being water resistant, sun resistant, buoyant, having adequate castability mass, abrasion resistance, having the right flexibility (not too stiff & not too soft), having axial strain/stretch characteristics under axial load to resist breaking-giving a dampening force to lessen the shock on the line from a sudden axial load from a hooked fish, so these desirable material properties of the nylon monofilament fish line are what makes it difficult to tie a knot with, as the line is fairly stiff with the slick outer surface. Further when a knot is tied in the fish line; the slick surface and rigidity tend to unravel knots, wherein if a knot is tied too tight-it could "kink" (permanently strain or deform) the line causing a weak point from the yielded material. Thus, it is essential to properly tie the knot in fish line that is known from experience to work well by staying tied and to avoid causing weak points in the line from "kinking".

The blood knot is one such knot that is proven to keep the two fishing lines tied together without the aforementioned "kinking", while providing a relatively smooth outer knot surface for sliding through various apertures. Limitations of the blood knot are that the two line diameters cannot be highly dissimilar is size, type, or texture to one another, and the advantages of the blood knot are that it is an in-line axial joining between the separate lines (doesn't cause an angle as between the two tied lines lengthwise), so the blood knot travels smoothly therethrough the rod guides (or other apertures), plus resulting in a knot that does not compromise line strength, however, the drawback can be the difficulty in tying the blood knot with an individual's manual bare hands, especially when it is cold out, poor ambient lighting, the hands are wet or oily, in addition to poor eyesight or dexterity issues of the individual.

Further, as previously stated the knot must not kink the line or come loose or slip. As anyone who has tried it, tying a knot in a monofilament fishing line is not easy, as the line itself resists bending easily, plus the transparent nature on the line makes it hard to see it, further the small size-diameter wise of the fish line being about 0.020 of an inch typically, makes it even harder to see and work with, and especially in the case of an individual, wherein their skills of eyesight, motor skills, manual dexterity all are not optimal, making the tying of a knot as between two fishing lines all the more difficult, especially if this is a task that they occasionally do. Plus adding to this, that the knotted portion of the fish line is the weakest point due to the sharp bends and folds in the line causing stress points or tears, thus the need for correct knot tying is important to minimize the chance of the fish line breaking or becoming loose or untied where the knot is tied.

Thus the prior art recognizes these issues with various apparatus and devices that assist the individual in tying knots in fishing line. Looking at the prior art in this area in U.S. Pat. No. 3,169,787 to Zolezzi, disclosed is a knot-tying device comprising a housing block and a pair of helical spring loaded releasable retaining means carried by the block for releasably retaining the ends of a pair of lines, respectively, against a face of the housing block. Zolezzi also includes a pair of substantially flat spring loaded housing side retaining plates respectively urging said plates into engagement with the face of the housing block. Looking at FIG. 3 of Zolezzi it can be seen that the side retaining plates (elements 3 & 4) are operational to retain the fishing line (elements 21 & 22) against the side of the housing block, however greatly risking that the side retaining plates will "nick" the line via compressing an edge of the side retaining plate as against the side of the housing block with the line caught therebetween, while the line is slid into and out of the side retaining plate, wherein the "nick" will cause a substantial weakening if the line and defeat the purpose of the blood knot's strength.

Continuing in the prior art for knot tying implements in U.S. Pat. No. 3,881,757 to Guinther disclosed is a knot tying implement comprising a body having a longitudinal bore therethrough; a cavity formed axially in the upper part of the body for receiving the center portion of a knot; gripper means attached to the opposite sides of the body and forming strand receiving slots for holding a strand of leader against the body and for forming a loop from the strand around the body; and a hook member axially movable in the bore and having a hook portion extending above said upper part of the body for holding said center portion of the knot in the cavity while the knot is being tightened and finished by pulling on the ends of the strand. Guinther's finished knot is shown in FIG. 5 wherein the purpose is to leave a tied loop disposed axially within the fish line that is continuous axially or lengthwise, see FIG. 1.

Further, in the prior art for fish line support structures in U.S. Pat. No. 2,843,961 to Semple disclosed is an improved structure and method for tying a leader to a hook or fly by supporting the eyed hook and leader in a vice like manner under axial tension during the tying or knotting of the leader material about the hook, see FIG. 2. In Semple '961, the goal is to have straight axial alignment as between the hook eye and the leader line so that the hook draws straight in the water and not at an angle which can diminish the chances of a fish taking the hook, wherein this goal is accomplished via the aligning support structure.

Next, a blood knot tying implement is disclosed in U.S. Pat. No. 2,825,592 to Semple, being an improved structure and method for facilitating the tying of the barrel knot and allied knots utilized for splicing and joining the free extremities of lines or of lines and leaders. In Semple '592 three embodiments are identified by FIGS. 1 to 3, 4 to 6, and 7 to 9, in looking at the embodiment in FIGS. 4 to 6; disc elements 22 & 23 are utilized to pinch the two separate sections of line at disc elements 29 & 30 necessitating the line to bend around slot element 31 risking nicking or pinching the line causing undesirable damage resulting in the knot having inferior strength. In Semple's '592 other two embodiments, the same issue appears with slot elements 15 & 38, further see FIGS. 10 and 11 show this schematically with the line elements 46 & 48 being forced around a tortuous path which is not desirable.

Moving onward, in the line threading device arts in U.S. Pat. No. 2,783,571 to Stilwell, disclosed are devices for threading a strand of yarn through the eye of a hook, needle, or other pointed element, and more particularly to a device which is especially designed to facilitate the threading of a line through the eye of a fishing-hook and its securement. In Stilwell, the hook is magnetically held into position, wherein a guide bore threads the line therethrough the hook eye, further comprising a split bore to facilitate removal of the threaded line and hook from the device.

What is needed is a line knot tying apparatus that eliminates the need to completely manually tie knots in fishing monofilament line when changing line strength ratings, replacing damaged line, changing leaders, changing lures, bait, and the like. Thus the present invention would allow for easier and quicker fishing line joining, especially by physically challenged occasional fisherman who's eyesight and manual dexterity are compromised and who don't fish on a regular basis by not having to cut and re-tie the fish line numerous times thus being out of practice. Thus the skill, patience, needing good light, needing good weather-meaning dry and no wind, or being in a rocking boat, issues are not a problem when the fisherman is relieved from having to tie knots in fishing line multiple times to attach or re-attach to connectors.

Further, ideally the line knot tying apparatus would be easily portable, fitting within a pocket, in addition, the apparatus should be structured to not harm the line in any manner such as in creating nicks, cuts, folds, kinks, and the like-that would weaken the knot. Also the apparatus would make tying the blood knot easy, quick, and reliable, thus allowing the individual to enjoy the benefits of the blood knot.

SUMMARY OF INVENTION

A line knot tying apparatus is disclosed that assists in joining two separate line free ends that are defined as a first line free end portion and a second line free end portion, wherein the tying apparatus assists in joining the first and second line free end portions in a selected knot.

The knot tying apparatus includes a housing having a longitudinal axis disposed within a first plane and a perpendicularly positioned lateral axis also disposed within the first plane, further the housing has a side long axis positioned perpendicular to the first plane, the longitudinal axis and the lateral axis intersect one another within the first plane at a first juncture, wherein the side long axis further intersects at the first juncture, also an aperture is disposed therethrough the housing, the aperture having an aperture axis, the aperture axis being positioned parallel to the longitudinal axis.

Also included in the knot tying apparatus is an extension element that is disposed within the aperture, the extension element is slidably engaged to the aperture, the extension element protrudes in an expanded section beyond the housing in the form of a cantilever, the expanded section forms a removably engagable clamp with the housing. Further, a means for biasing the expanded section as against the housing creating a clamp closed state for the extension element from a clamp open state at the extension element when the expanded section is not against the housing forming a gap as between the housing and the expanded section.

In addition, included in the knot tying apparatus is a helical coil wound with continuously increasing pitch line distance in a cantilever manner wherein the continuously increasing pitch line distance forms a plurality of continuously increasing spring loaded spaces positioned as between the coils resulting in smooth curved space entrances and exits with the helical coil being attached to the housing. Wherein operationally the first line free end portion and the second line free end portion each have a manual removable slidable engagement to the plurality of spaces being size selected to be an appropriate space based on a line diameter, wherein the smooth rounded spaces help ensure against line outer surface damage during the line removable slidable engagement to the coil.

Further operationally, the first and second line free end portions project in a cantilever manner beyond the coil at a selected distance in opposite directions, continuing operationally the first line free end portion is manually wound around a non-cantilever portion of the second line and then repeated in a plurality of first loops wherein the first line free end portion is then secured between the housing and the expanded section via the clamp. Next the second line free end portion is manually wound around a non-cantilever portion of the first line and then repeated in a plurality of second loops wherein the second line free end portion is secured between the housing and the expanded section via the clamp, wherein the first and second line free end portions are each manually removed from the plurality of spaces. Also operationally, the first and second lines non-cantilever portions are manually pulled apart from one another to draw the plurality of first and second loops tight, wherein the first and second lines cantilever portions are then unsecured and removed from between the housing and the expanded section at the clamp, moving the clamp from the clamp closed state to the clamp open state, resulting in the knot securing the first and second lines free end portions together.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
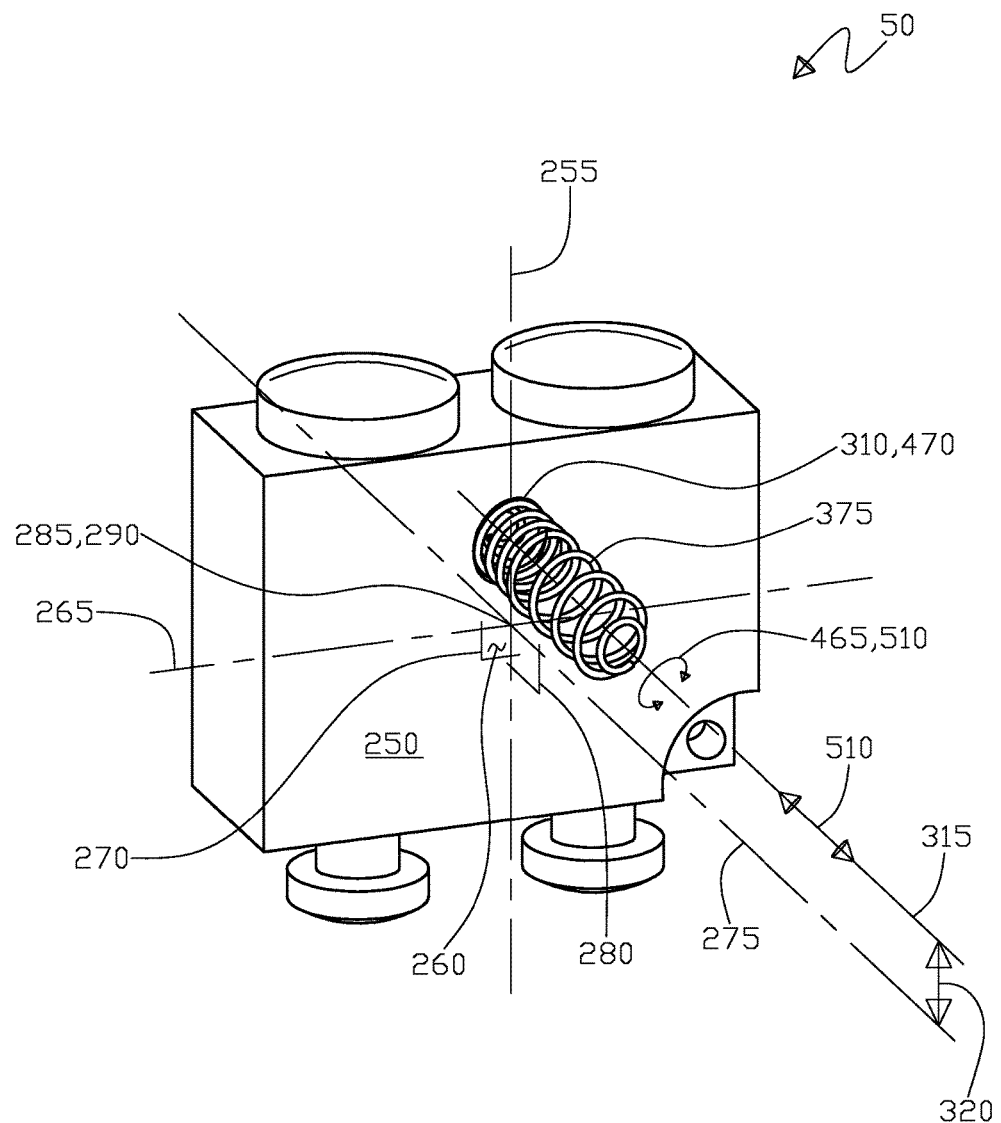
FIG. 1 shows a perspective view of the line knot tying apparatus that includes a housing, a pair of extension elements, a helical coil, a longitudinal axis, a lateral axis, a side long axis, a first plane, a first juncture, a length axis, an opening, retaining the helical coil in the opening, a movement of the helical coil about the length axis, plus a resisting of the helical coil movement about and along the length axis.

50 Line knot tying apparatus
55 First line
60 Diameter of the first line 55
65 Free end portion of the first line 55
70 Removable slidable engagement of the first line 55 free end portion 65 to a selected space 395 based on the first line diameter 60
75 Cantilever manner projection portion of the free end portion 65 of the first line 55
80 Selected distance of the cantilever manner projection portion 75 of the free end portion 65 of the first line 55
85 Non cantilever manner projection portion of the free end portion 65 of the first line 55
90 Outer surface of the first line 55
95 Damage to the outer surface 90 of the first line 55
100 Manually wound first line 55 free end portion 65
105 Wound direction of the first line 55 free end portion 65 behind and over the top of the second line 145 non cantilever portion 175
110 Plurality of first loops from the manually wound 100 first line 55 free end portion 65
115 Securing the first line 55 free end portion 65 as between the housing 250 and the expanded section 340 via the clamp 350
120 Manually removing the first line 55 free end portion 65 from the plurality of spaces 395
125 Manually pulling the first line 55 non cantilever portion 85 in a first direction
130 Pulling to draw the plurality of first loops 110 tight
135 Unsecured portion of the cantilevered 75 first line 55
140 Un-securing the first line 55 cantilever portion 75 from between the housing 250 and the expanded section 340 at the clamp 350 via un-biasing 355 the expanded section 340 from the housing 250 in manually moving the clamp 350 from the closed state 360 to the open state 365
145 Second line
150 Diameter of the second line 145
155 Free end portion of the second line 145
160 Removable slidable engagement of the second line 145 free end portion 155 to a selected space 395 based on the second line 145 diameter 150
165 Cantilever manner projection portion of the free end portion 155 of the second line 145
170 Selected distance of the cantilever manner projection portion 165 of the free end portion 155 of the second line 145
175 Non cantilever manner projection portion of the free end portion 155 of the second line 145
180 Outer surface of the second line 145
185 Damage to the outer surface 180 of the second line 145
190 Manually wound second line 145 free end portion 155
195 Wound direction of the second line 145 free end portion 155 in front of and over the top of the first line 55 non cantilever portion 85
200 Plurality of second loops from the manually wound second line 145 free end portion 155
205 Securing the second line 145 free end portion 155 as between the housing 250 and the expanded section 340 via the clamp 350
210 Manually removing the second line 145 free end portion 155 from the plurality of spaces 395
215 Manually pulling the second line 145 non cantilever projection portion 175 in a second direction
220 Pulling to draw the plurality of second loops 200 tight
225 Unsecured portion of the cantilevered 165 second line 145
230 Un-securing the second line 145 cantilever portion 165 from between the housing 250 and the expanded section 340 via un-biasing 355 the expanded section 340 from the housing 250 in manually moving the clamp 350 from the closed state 360 to the open state 365
235 Forming the selected knot 240
240 Selected knot preferably in the form of a blood or barrel knot
245 Manually cutting and trimming the remaining first 155 and second 65 line free end portions
250 Housing
255 Longitudinal axis of the housing 250
260 First plane
265 Lateral axis
270 Perpendicular position of the longitudinal axis 255 and the lateral axis 265
275 Side long axis
280 Perpendicular position of the side long axis 275 to the first plane 260
285 Intersect of the longitudinal axis 255, the lateral axis 265, and the side long axis 275 within the first plane 260 forming a first juncture 290
290 First juncture
295 Aperture
300 Axis of aperture 295
305 Parallel position of the aperture axis 300 to the longitudinal axis 255
310 Opening disposed therethrough the housing 250
315 Length axis of the opening 310
320 Parallel position of the length axis 315 and the side long axis 275
325 Extension element
330 Slidable engagement of the extension element 325 to the aperture 295
335 Protrusion of the extension element 325
340 Expanded section of the protrusion 335
345 Cantilever form of the protrusion 335
350 Removably engagable clamp of the expended section 340 to the housing 250
355 Means for biasing or creating bias as between the expanded section 340 as against the housing 250 to create the closed state 360 as a default
360 Closed state of the clamp 350
365 Open state of the clamp 350
370 Gap of the clamp 350
375 Helical coil
380 Pitch line of the helical coil 375
385 Distance of the pitch line 380

390 Plurality of continuously increasing pitch line distances 385 that form continuously increasing spring loaded spaces 395
395 Spring loaded spaces
400 Section of the helical coil 375 that has the increasing pitch line distance 385
405 Cantilever manner of the plurality of continuously increasing pitch line distances 390
410 Smooth curved space entrances and exits for the spring loaded spaces 395
415 Attachment of the helical coil 375 to the housing 250
420 Continuous cross section of the helical coil 375
425 Circular cross section of the helical coil 375
430 Smooth outside surface of the helical coil 375
435 Constant pitch line distance of the helical coil 375
440 Section of the helical coil 375 that has the constant pitch line distance 435
445 Outer surface of the constant pitch line distance section 440
450 Outside diameter of the constant pitch line distance section 440
455 Outer surface of the constant pitch line distance section 440
460 Pitch distance of the constant pitch line distance section 440
465 Free rotation of the helical coil 375 about the length axis 315
470 Retaining the helical coil 375 within the opening 310 along the length 315, longitudinal 255, and lateral 265 axes
475 Opening 310 being sized and configured to matingly receive the outer surface 445 of the constant pitch line distance section 440
480 Internal thread of the opening 310
485 Minor diameter of the internal thread 480
490 Pitch diameter of the internal thread 480
495 Major diameter of the internal thread 480
500 Pitch distance at the pitch diameter 490 of the internal thread 480
505 Threaded interface formed from the sized and configured opening 475 matingly receiving the outer surface 445 of the constant pitch line section 440
510 Resisting movement of the helical coil 375 about and along the length axis 315 and the in relation to the opening 310
515 Engaging and removably retaining in a manual slidable manner the first line 55 free end portion 65 and the second line 145 free end portion 155 to each one of the plurality of spaces 395
520 Positioning the first 65 and second 155 line free end portions to axially project in a cantilever manner 75, 165 at the selected distance 80, 170 respectively
525 Winding manually the first line 55 free end portion 65 around the non-cantilever portion 175 of the second line 145 and repeating in a plurality of first loops 110
535 Securing the first line 55 free end portion 65 between the housing 250 and the expanded section 340 via the clamp 350 by pushing the extension element 325 against the bias 355 to go from the closed state 360 to the open state 365 and placing the first line 55 free end portion 65 between the housing 250 and the expanded section 340 and then manually releasing the extension element 325 to allow the open state 365 to go to the closed state 360 via the bias 355
540 Winding manually the second line 145 free end portion 155 around the non-cantilever portion 85 of the first line 55 and repeating in a plurality of second loops 200
545 Securing the second line 145 free end portion 155 between the housing 250 and the expanded section 340 via the clamp 350 by pushing the extension element 325 against the bias 355 to go from the closed state 360 to the open state 365 and placing the second line 145 free end portion 155 between the housing 250 and the expanded section 340 and then manually releasing the extension element 325 to allow the open state 365 to go to the closed state 360 via the bias 355
550 Removing manually the first 65 and second 155 line free end portions from the plurality of spaces 395
555 Pulling manually apart the first 85 and second 175 lines non-cantilever portions from one another to draw the plurality of first 110 and second 200 loops tight
560 Removing manually the first 135 and second 225 lines cantilever portions that are unsecured from the knot tying apparatus 50 via pulling the first 135 and second 225 lines cantilever unsecured portions from between the housing 250 and the expanded section 340 at the clamp 350, resulting in the selected knot 240 securing the first 65 and second 155 lines free end portions together
565 Opposing rotational directions of the first 110 and second 200 loops
570 Outer profile of the selected knot 240 that is relatively smooth as compared to other knots
575 Eyelets
580 Smaller first line 55 diameter
585 Larger second line 145 diameter
590 Smaller space of spaces 395
595 Larger space of spaces 395

DETAILED DESCRIPTION

With initial reference to FIG. 1 shown is a perspective view of the line knot tying apparatus 50 that includes a housing 250, a pair of extension elements 325, a helical coil 375, a longitudinal axis 255, a lateral axis 265, a side long axis 275, a first plane 260, a first juncture 290, a length axis 315, an opening 310, retaining 470 the helical coil 375 in the opening 310, a movement 465 of the helical coil 375 about the length axis 315, plus a resisting of the movement 510 about and along the length axis 315.

Figure 2:
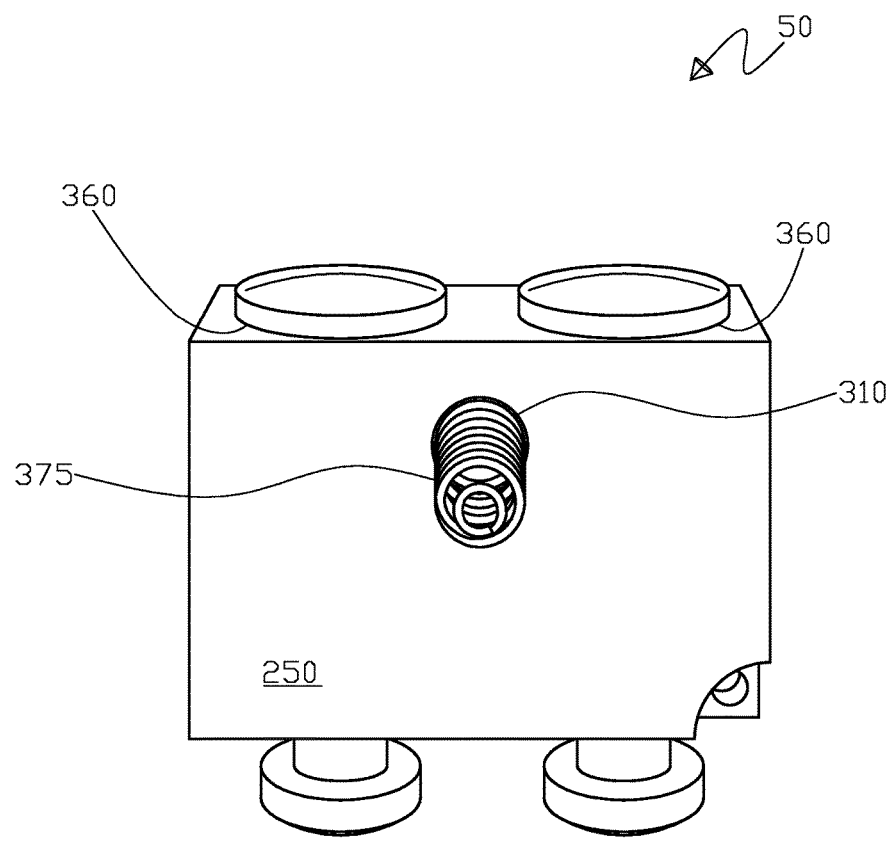
FIG. 2 shows an elevated front elevation view of the line knot tying apparatus that includes the housing, a closed state of a clamp as between the extension element expanded section, and the housing, along with the helical coil and the opening.
Figure 3:
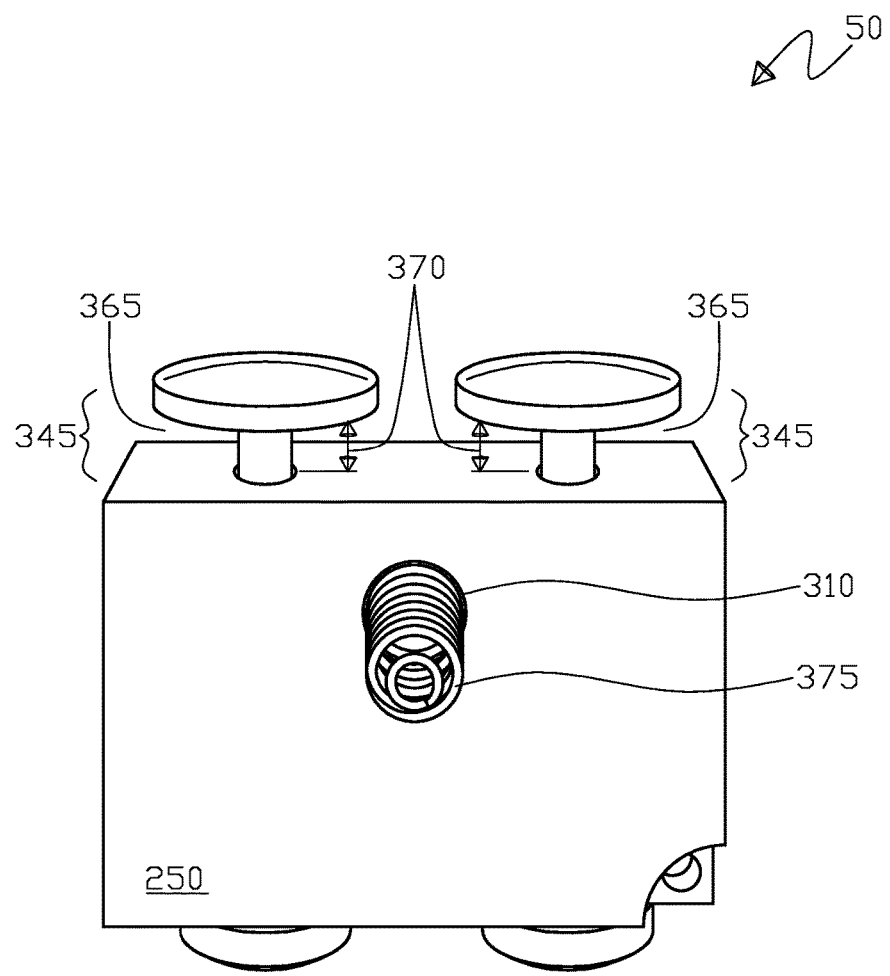
FIG. 3 shows an elevated front elevation view of the line knot tying apparatus that includes the housing, an open state of the clamp as between the extension element expanded section, and the housing, along with the helical coil and the opening.

Next, FIG. 2 shows an elevated front elevation view of the line knot tying apparatus 50 that includes the housing 250, a closed state 360 of a clamp 350 as between the extension element 325 expanded section 340, and the housing 250, along with the helical coil 375 and the opening 310. Continuing, FIG. 3 shows an elevated front elevation view of the line knot tying apparatus 50 that includes the housing 250, an open state 365 of the clamp 350 as between the extension element 325 expanded section 340, and the housing 250, along with the helical coil 375 and the opening 310.

Figure 4:
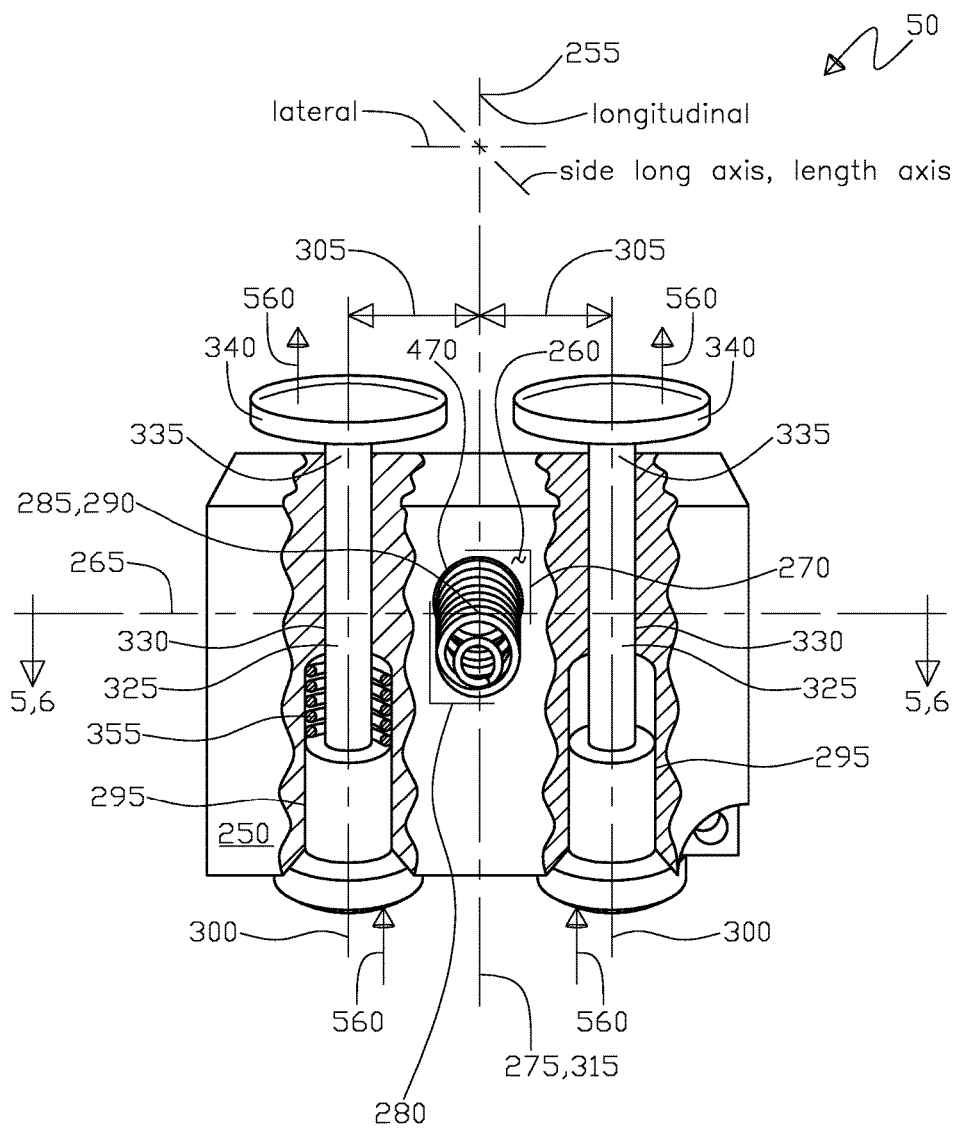
FIG. 4 shows an elevated front elevation view of the line knot tying apparatus that includes the housing, the open state of the clamp as between the extension element expanded section wherein the housing is opened up to show that the extension element is slidably engaged to an aperture disposed having an aperture axis within the housing and the housing, plus a means for biasing the expanded section as against the housing creating the closed state, wherein a manual removing of a first and second line cantilever portion (not shown) places the expanded section into the open state as against the means for biasing, along with the helical coil and the opening.

Further, FIG. 4 shows an elevated front elevation view of the line knot tying apparatus 50 that includes the housing 250, the open state 365 of the clamp 350 as between the extension element 325 expanded section 340 wherein the housing 250 is opened up to show that the extension element 325 is slidably engaged 330 to an aperture 295 disposed in the housing 250, with the aperture 295 having an aperture axis 300 within the housing 250. Plus FIG. 4 has a means for biasing 355 the expanded section 340 as against the housing 250 creating the closed state 360, wherein a manual removing 120, 210 of a first 75 and second 165 line cantilever portion (not shown) places the expanded section 340 into the open state 365 as against the means for biasing 355, along with the helical coil 375 and the opening 310.

Figure 5:
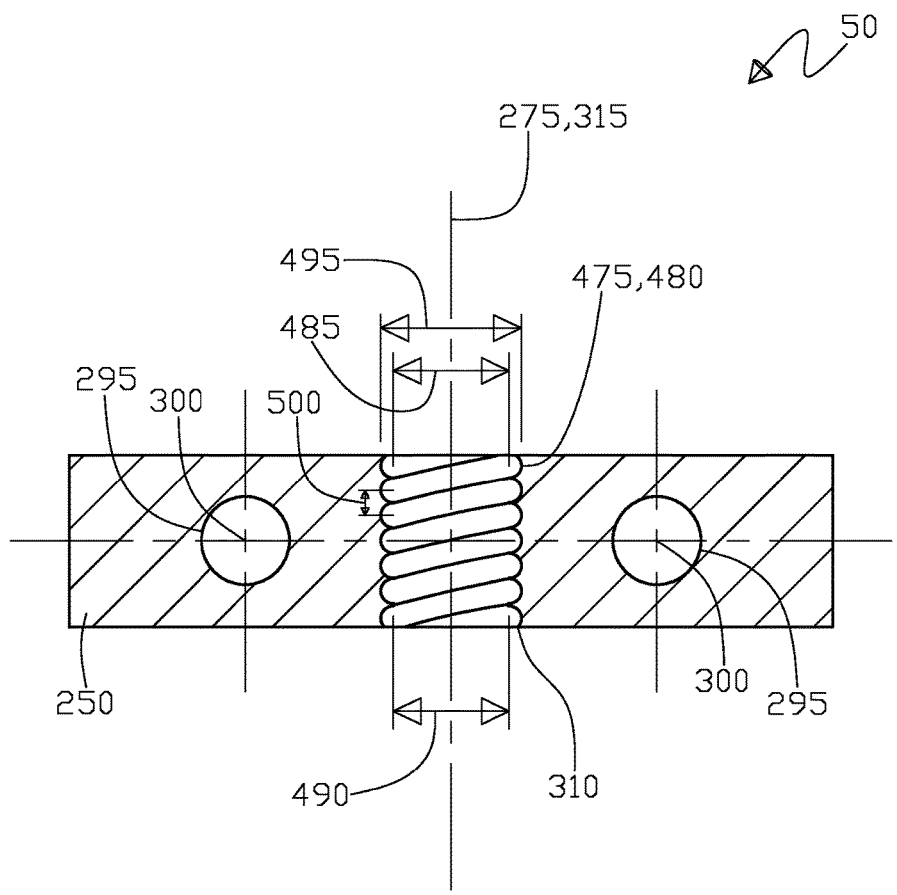
FIG. 5 shows cross section view 5-5 taken from FIGS. 4 and 9, of the housing, showing in particular the aperture, the aperture axis, and the opening with the length axis that includes a sizing and configuring of the opening to matingly receive the outer surface of the constant pitch line distance section (not shown), further shown is a pitch diameter of an internal thread, plus a major diameter, and a minor diameter all of the opening.
Figure 9:
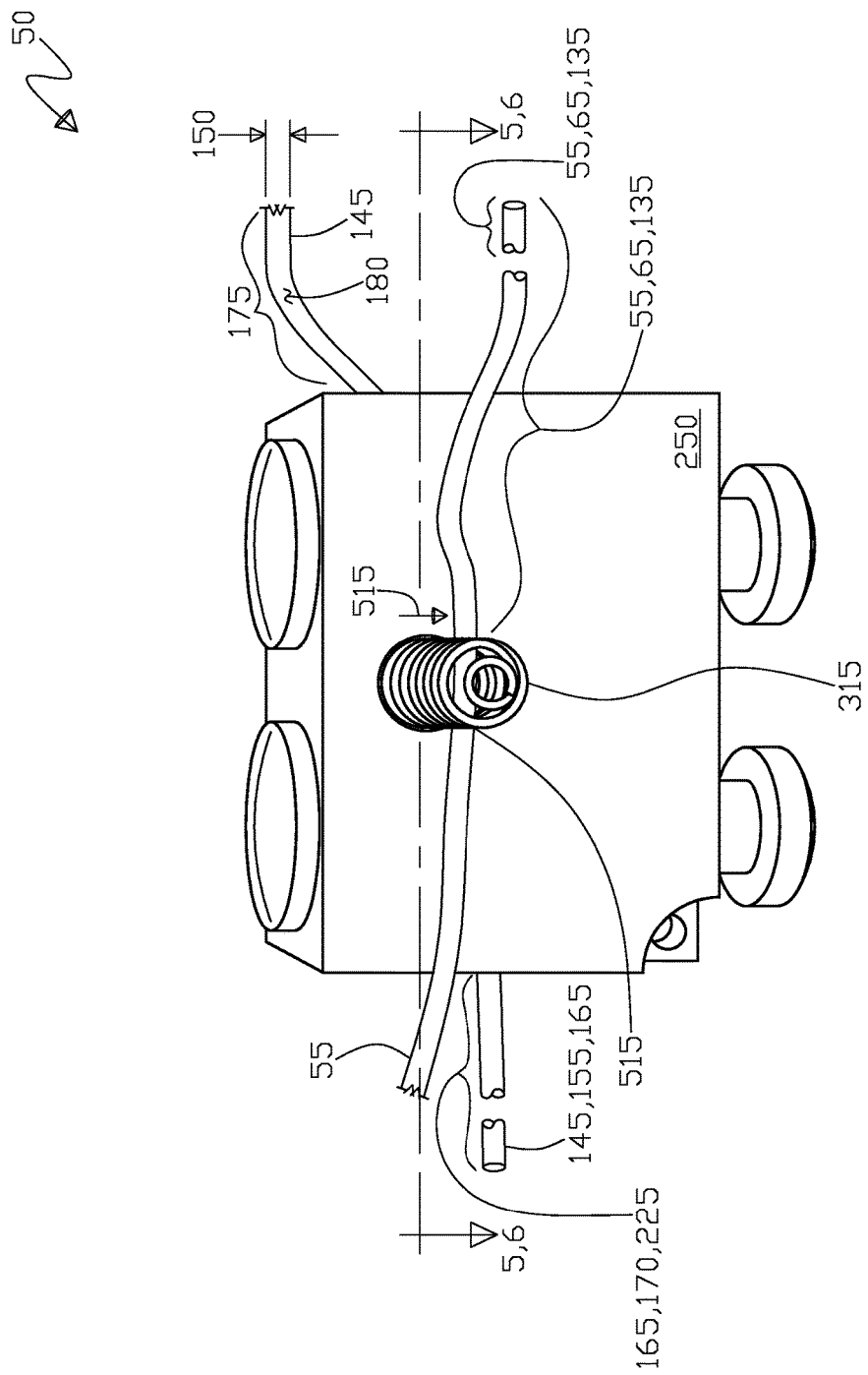
FIG. 9 shows an elevated front elevation view of the line knot tying apparatus that includes the housing, the closed state of the clamp as between the extension element expanded section, and the housing, along with the helical coil and the opening, further the first and second lines are shown plus in particular the first and second lines that include the non-cantilever projection portions and the cantilever manner projection portions that are on opposing sides of the helical coil as the helical coil retains the first and second lines in a manner that helps prevent outer surface damage from the smooth entrances for the spaces in the helical coil, (noting that the second line is partially hidden along with its helical coil)

Moving onward, FIG. 5 shows cross section view 5-5 taken from FIGS. 4 and 9, of the housing 250, showing in particular the aperture 295, the aperture axis 300, and the opening 310 with the length axis 315 that includes a sizing and configuring 475 of the opening 310 to matingly receive the outer surface 445 of the constant pitch line distance section 440 (not shown), further shown is a pitch diameter 490 of an internal thread 480, plus a major diameter 495, and a minor diameter 485 all of the opening 310.

Figure 6:
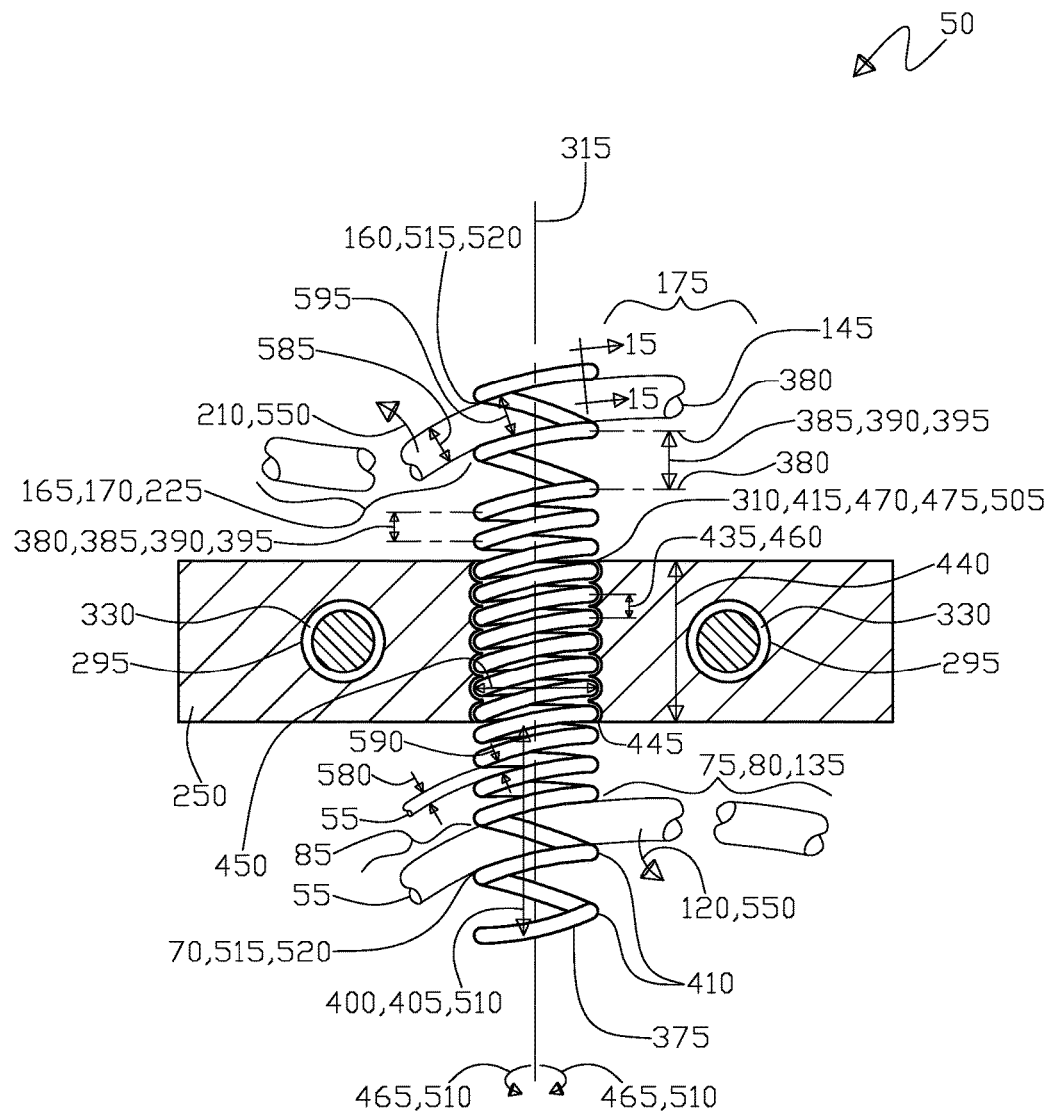
FIG. 6 shows cross section view 6-6 taken from FIGS. 4 and 9 of the housing, showing in particular the aperture, the aperture axis, and the opening with the length axis that includes the sizing and configuring of the opening to matingly receive the outer surface of the constant pitch line distance section of the helical coil, further shown is a constant pitch distance, an outside diameter of the constant pitch section, plus an a section of continuously increasing pitch line distances of the helical coil (progressive spring) that accommodates and retains the first and second lines in a smooth and non-abrasive manner to help prevent damage to the outer surface of the first and second lines, further showing the continuously increasing pitch line distances of the helical coil accommodating smaller first line diameter with a smaller space and accommodating a larger second line diameter with a larger space in the same smooth and non-abrasive manner again to help prevent damage to the outer surface of the first and second lines.

Continuing, FIG. 6 shows cross section view 6-6 taken from FIGS. 4 and 9 of the housing 250, showing in particular the aperture 295, the aperture axis 300, and the opening 310 with the length axis 315 that includes the sizing and configuring 475 of the opening 310 to matingly receive the outer surface 445 of the constant pitch line distance section 440 of the helical coil 375. Further shown in FIG. 6 is a constant pitch distance 435, 460, an outside diameter 450 of the constant pitch section 440, plus an a section 400 of continuously increasing pitch line distances of the helical coil 375 (similar to a progressive spring) that accommodates and retains the first 55 and second 145 lines in a smooth and non-abrasive manner to help prevent damage 95, 185 to the outer surfaces 90, 180 of the first 55 and second 145 lines. In addition, FIG. 6 further showing the continuously increasing pitch line distances 385, 390, 395 of the helical coil 375 accommodating a smaller first line 55 diameter 580 with a smaller space 590 and accommodating a larger second line 145 diameter 585 with a larger space 595 in the same smooth and non-abrasive manner 410 again to help prevent damage 95, 185 to the outer surface 90, 180 of the first 55 and second 145 lines.

Figure 7:
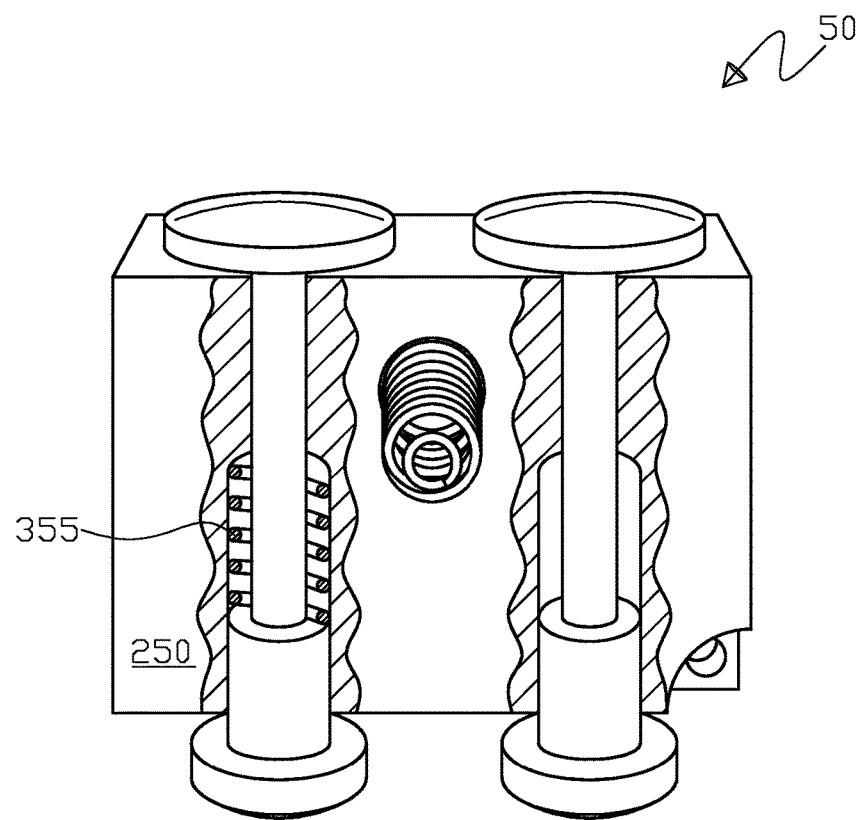
FIG. 7 shows an elevated front elevation view of the line knot tying apparatus that includes the housing, the open state of the clamp as between the extension element expanded section, wherein the housing is opened up to show that the extension element is slidably engaged to the aperture disposed within the housing having the aperture axis within the housing, plus the means for biasing the expanded section as against the housing creating the closed state.

Further, FIG. 7 shows an elevated front elevation view of the line knot tying apparatus 50 that includes the housing 250, the open state 365 of the clamp 350 as between the extension element 325 expanded section 340, wherein the housing 250 is opened up to show that the extension element 325 is slidably engaged 330 to the aperture 295 disposed within the housing 250 having the aperture axis 300 within the housing 250, plus the means for biasing 355 the expanded section 340 as against the housing 250 creating the closed state 360.

Figure 8:
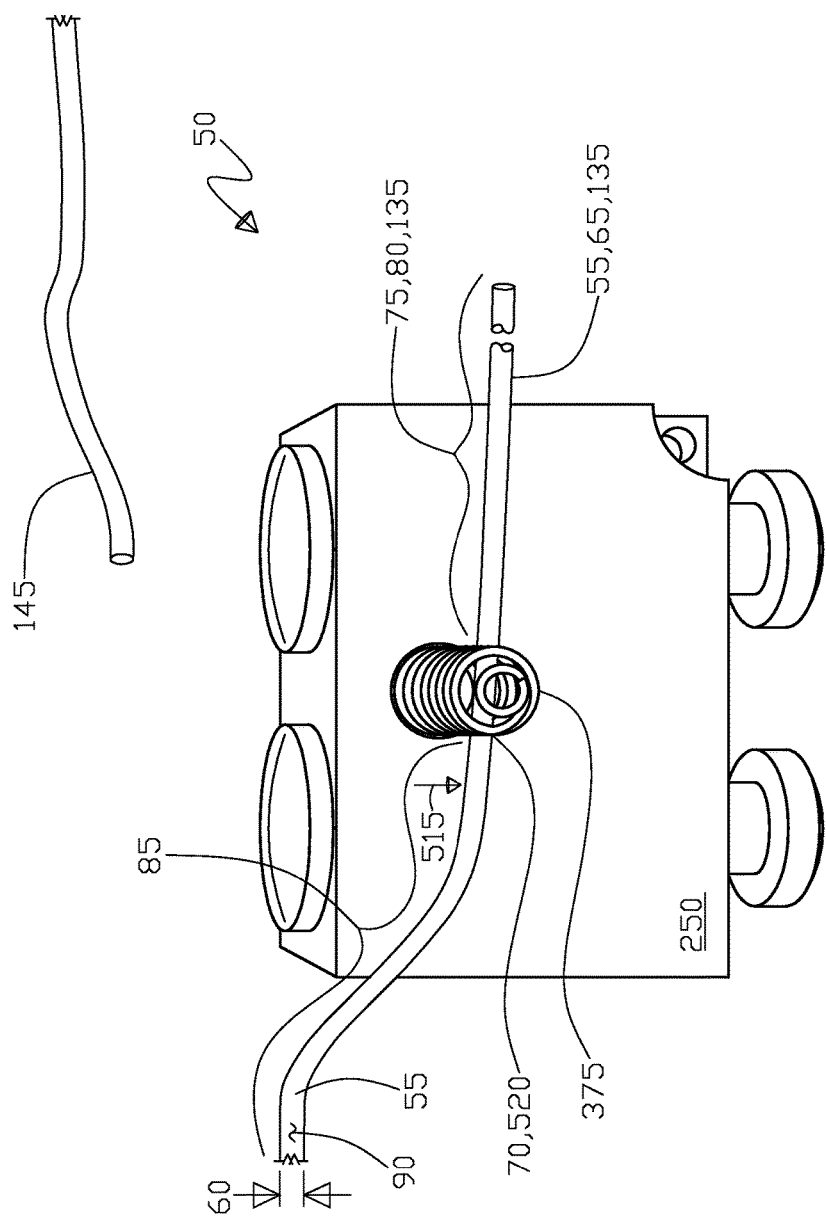
FIG. 8 shows an elevated front elevation view of the line knot tying apparatus that includes the housing, the closed state of the clamp as between the extension element expanded section, and the housing, along with the helical coil and the opening, further the first and second lines are shown plus in particular the first line that includes a non-cantilever projection portion and a cantilever manner projection portion that are on opposing sides of the helical coil as the helical coil retains the first line in a manner that helps prevent outer surface damage from the smooth entrances for the spaces in the helical coil.

In addition, FIG. 8 shows an elevated front elevation view of the line knot tying apparatus 50 that includes the housing 250, the closed state 360 of the clamp 350 as between the extension element 325 expanded section 340, and the housing 250, along with the helical coil 375 and the opening 310, further the first 55 and second 145 lines are shown plus in particular the first line 55 that includes a non-cantilever projection portion 85 and a cantilever manner projection portion 75 that are on opposing sides of the helical coil 375 as the helical coil 375 retains the first line 55 in a manner that helps prevent outer surface 90 damage 95 from the smooth entrances 410 for the spaces 395 in the helical coil 375.

Next, FIG. 9 shows an elevated front elevation view of the line knot tying apparatus 50 that includes the housing 250, the closed state 360 the clamp 350 as between the extension element 325 expanded section 340, and the housing 250, along with the helical coil 375 and the opening 310. Further FIG. 9 shows the first 55 and second 145 lines plus in particular the first 55 and second 145 lines that include the non-cantilever projection portions 85, 175 and the cantilever manner projection portions 75, 165 that are on opposing sides of the helical coil 375 as the helical coil 375 retains 515 the first 55 and second 145 lines in a manner that helps prevent outer surface 90, 180 damage 95, 185 from the smooth entrances 410 for the spaces 395 in the helical coil 375, (noting that the second line 145 is partially hidden along with its helical coil 375).

Figure 10:
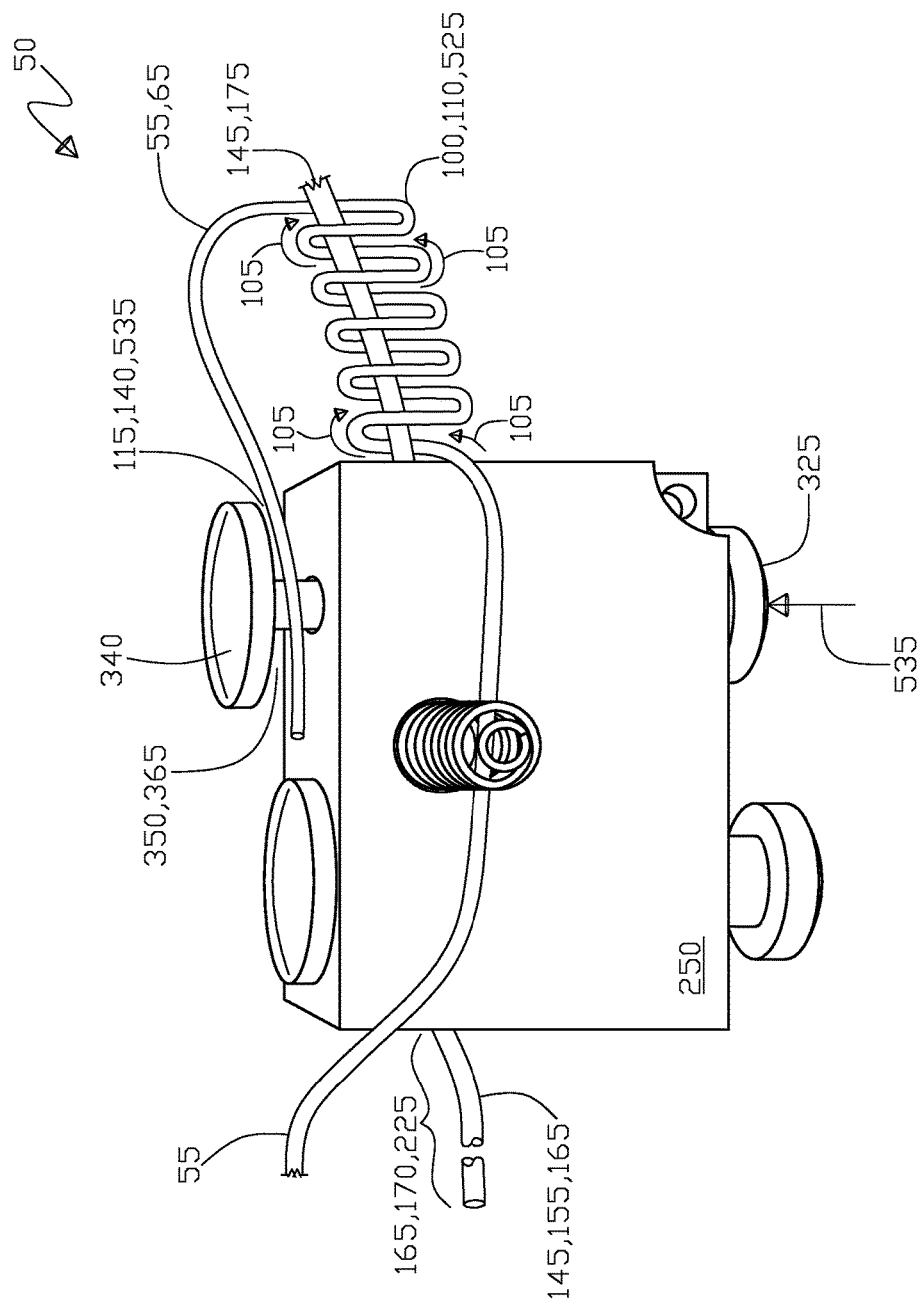
FIG. 10 shows an elevated front elevation view of the line knot tying apparatus that includes the housing, the closed state of the clamp as between the extension element expanded section, and the housing, along with the helical coil and the opening, further the first and second lines are shown plus in particular the first and second lines that include the non-cantilever projection portions and the cantilever manner projection portions that are on opposing sides of the helical coil as the helical coil retains the first and second lines in a manner that helps prevent outer surface damage from the smooth entrances for the spaces in the helical coil, (noting that the second line is partially hidden along with its helical coil), further the first line free end portion is wrapped in a plurality of first loops around the second line non cantilever manner projection portion wherein further the first line free end portion is being secured between the expanded section and the housing at the clamp via overcoming the means for bias of the extension element.

Moving onward, FIG. 10 shows an elevated front elevation view of the line knot tying apparatus 50 that includes the housing 250, the closed state 360 of the clamp 350 as between the extension element 325 expanded section 340, and the housing 250, along with the helical coil 375 and the opening 310. Further FIG. 10 shows the first 55 and second 145 lines plus in particular the first 55 and second 145 lines that include the non-cantilever projection portions 85, 175 and the cantilever manner projection portions 75, 165 that are on opposing sides of the helical coil 375 as the helical coil 375 retains 515 the first 55 and second 145 lines in a manner that helps prevent outer surface 90, 180 damage 95, 185 from the smooth entrances 410 for the spaces 395 in the helical coil 375, (noting that the second line 145 is partially hidden along with its helical coil 375). Also in FIG. 10, the first line 55 free end portion 65 is wrapped 100 in a plurality of first loops 110 around the second line 145 non cantilever manner projection portion 175, wherein further the first line 55 free end portion 65 is being secured 115, 535 between the expanded section 340 and the housing 250 at the clamp 350 via overcoming 535 the means for bias 355 of the extension element 325.

Figure 11:
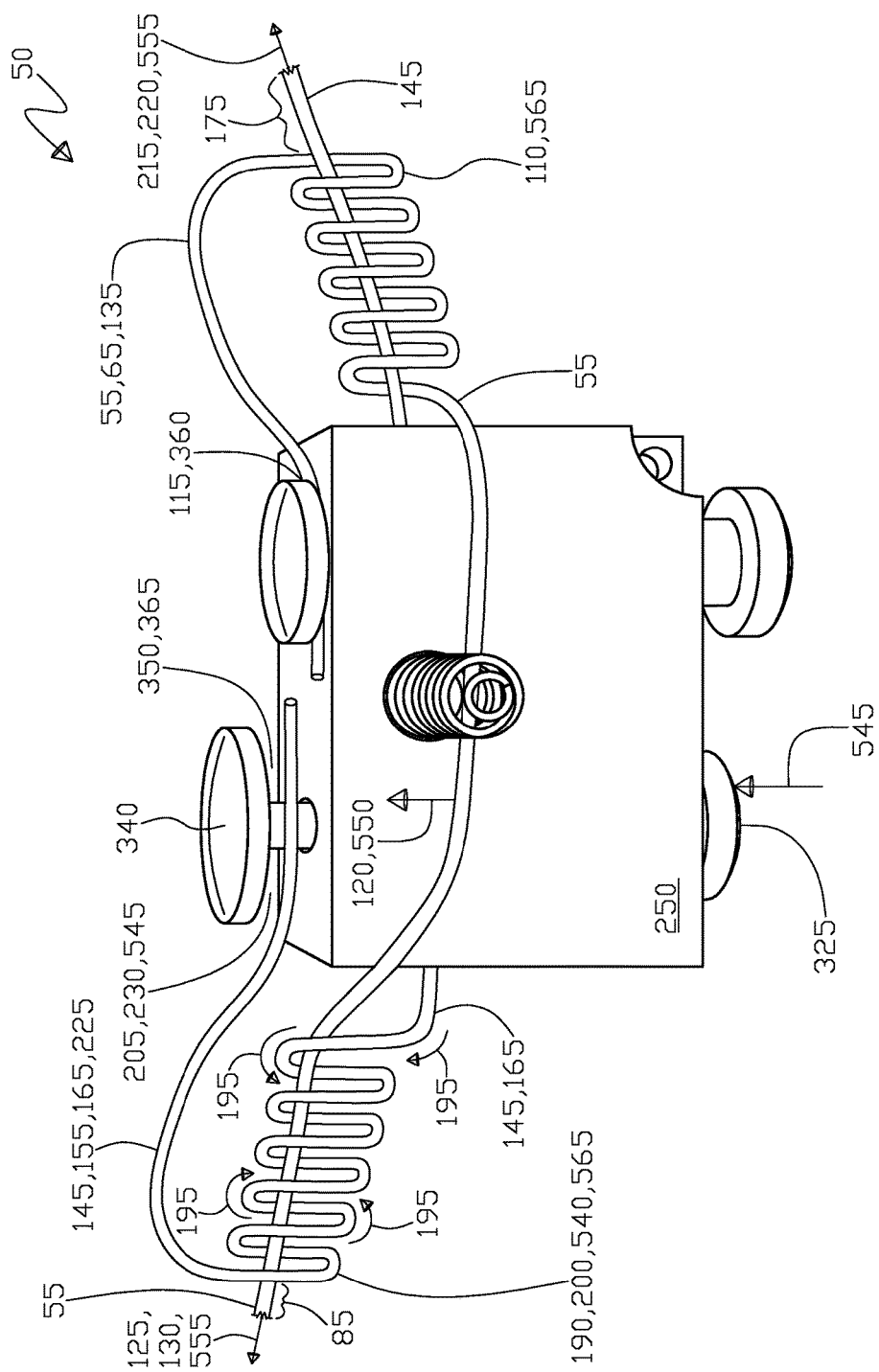
FIG. 11 shows an elevated front elevation view of the line knot tying apparatus that includes the housing, the closed state of the clamp as between the extension element expanded section, and the housing, along with the helical coil and the opening, further the first and second lines are shown plus in particular the first and second lines that include the non-cantilever projection portions and the cantilever manner projection portions that are on opposing sides of the helical coil as the helical coil retains the first and second lines in a manner that helps prevent outer surface damage from the smooth entrances for the spaces in the helical coil, (noting that the second line is partially hidden along with its helical coil), further the second line free end portion is wrapped in a plurality of second loops around the first line non cantilever manner projection portion wherein further the second line free end portion is being secured between the expanded section and the housing at the clamp via overcoming the means for bias of the extension element, in addition, the first and second lines are manually pulled apart while at the same time the first and second line freed end portions are removed from the plurality of spaces in the helical coil.

Moving ahead, FIG. 11 shows an elevated front elevation view of the line knot tying apparatus 50 that includes the housing 250, the closed state 360 of the clamp 350 as between the extension element 325 expanded section 340, and the housing 250, along with the helical coil 375 and the opening 310. In addition FIG. 11 shows the first 55 and second 145 lines plus in particular the first 55 and second 145 lines that include the non-cantilever projection portions 85, 175 and the cantilever manner projection portions 75, 165 that are on opposing sides of the helical coil 375 as the helical coil 375 retains the first 55 and second 145 in a manner that helps prevent outer surface 90, 180 damage 95, 185 from the smooth entrances 410 for the spaces 395 in the helical coil 375, (noting that the second line 145 is partially hidden along with its helical coil 375). Further in FIG. 11, the second line 145 free end portion 155 is wrapped 190 in a plurality of second loops 200 around the first line 55 non cantilever manner projection portion 85 wherein further the second line 145 free end portion 155 is being secured 205 between the expanded section 340 and the housing 250 at the clamp 350 via overcoming 545 the means for bias 355 of the extension element 325, in addition, the first 55 and second 145 lines are manually pulled apart 125, 130, 215, 220 while at the same time the first 55 and second 145 line free end portions 65, 155 are removed from the plurality of spaces 395 in the helical coil 375.

Figure 12:
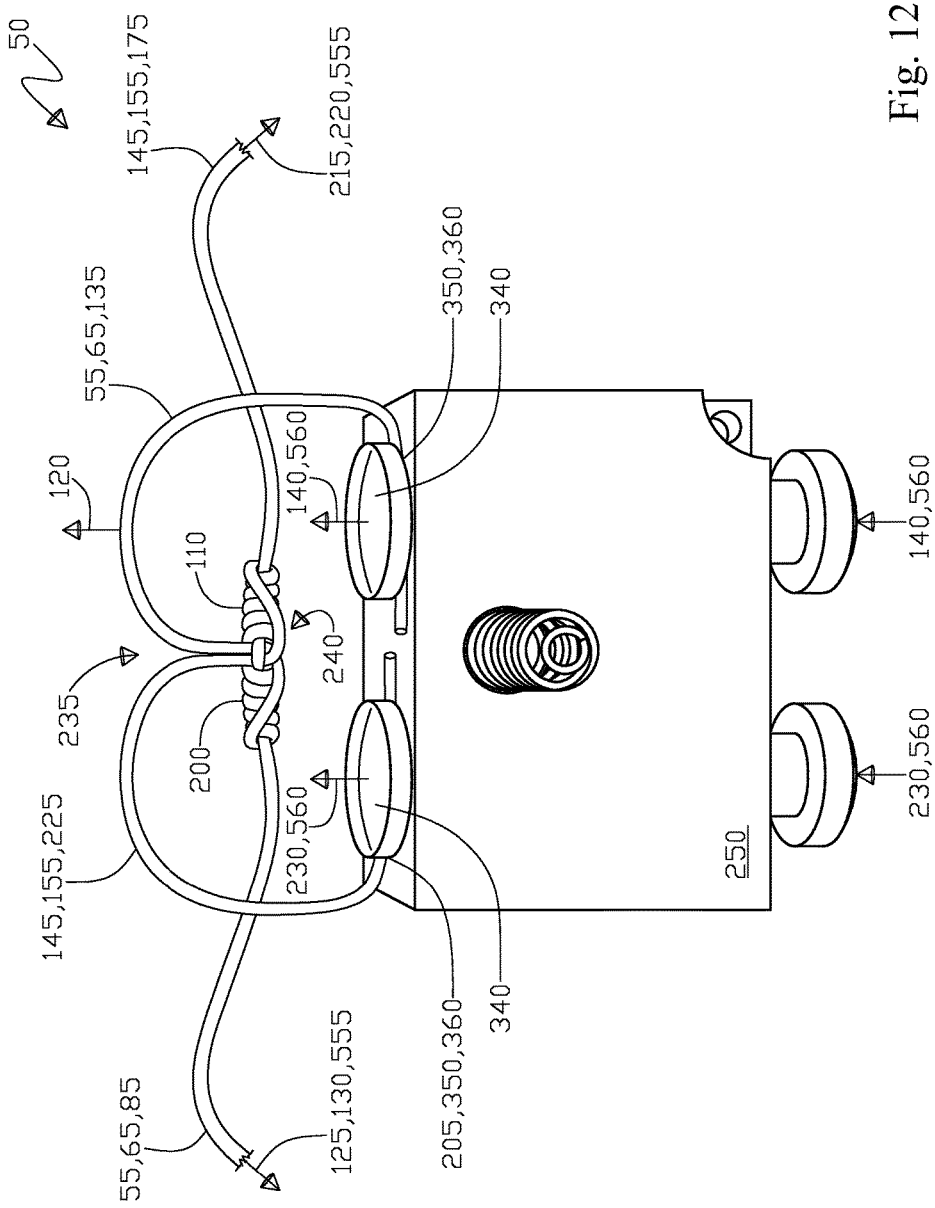
FIG. 12 shows the continuation of the manual pulling from FIG. 11 of the first and second line free end portions completed thus creating a selected knot that ties together the first and second lines, wherein a next step of un-securing the first and second lines cantilever portions from between the housing and the expanded section, via un-biasing the means for biasing through the expanded section of the extension element going from the closed state to the open state thus releasing the first and second lines cantilever portions from between the expanded section and housing.

Next, FIG. 12 shows the continuation of the manual pulling 125, 130, 215, 220 from FIG. 11 of the first 55 and second 145 line free end portions 65, 155 completed thus creating or forming 235 a selected knot 240 that ties together the first 55 and second 145 lines, wherein a next step of un-securing 140, 230, 560 the first 55 and 145 second lines cantilever portions 75, 165 from between the housing 250 and the expanded section 340, via un-biasing 140, 230, 560 the means for biasing 355 through the expanded section 340 of the extension element 325 going from the closed state 360 to the open state 365 thus releasing the first 55 and second 145 lines cantilever portions 75, 165 from between the expanded section 340 and housing 250.

Figure 13:
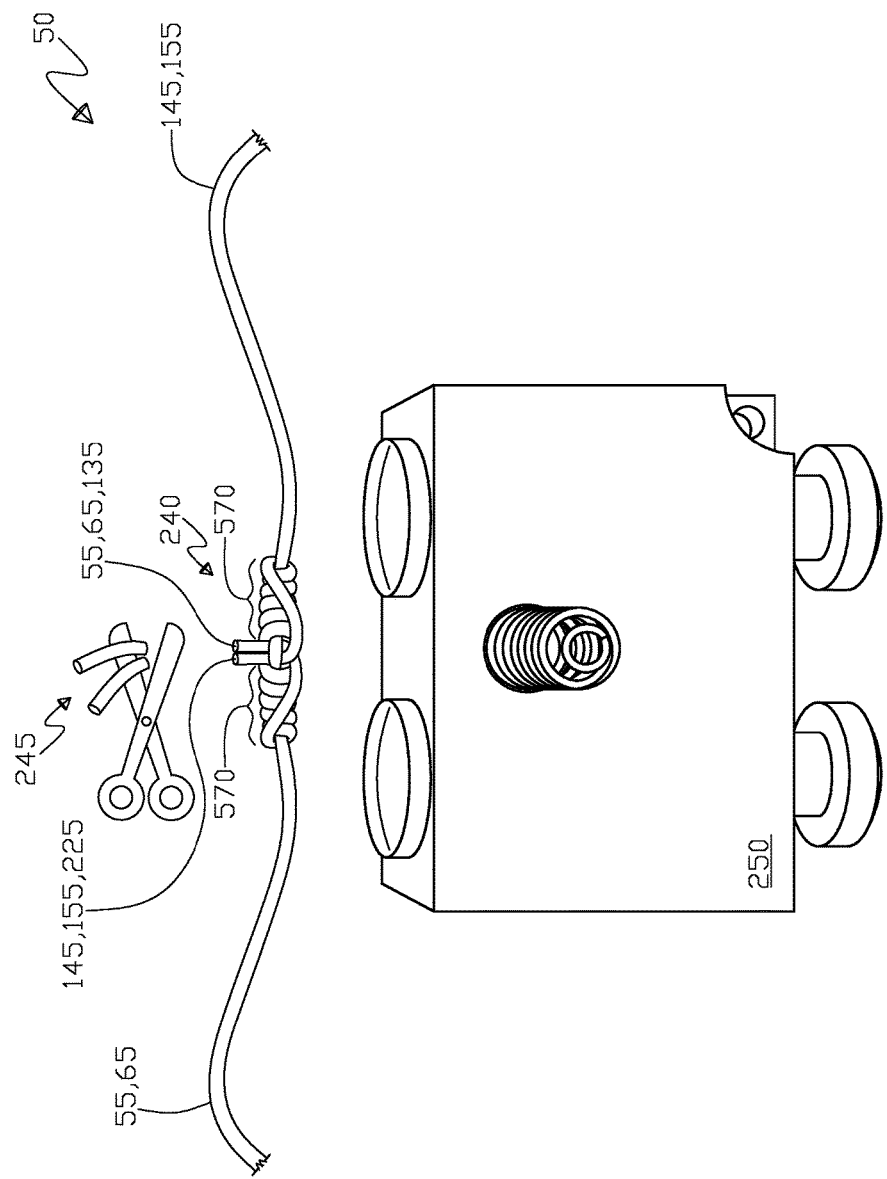
FIG. 13 shows the selected knot separated from the line know tying apparatus via the first and second lines cantilever portions being removed from between the housing and the expanded section, with the first and second lines free end portions being trimmed resulting in an outer profile for the selected knot that is relatively smooth.
Figure 14:
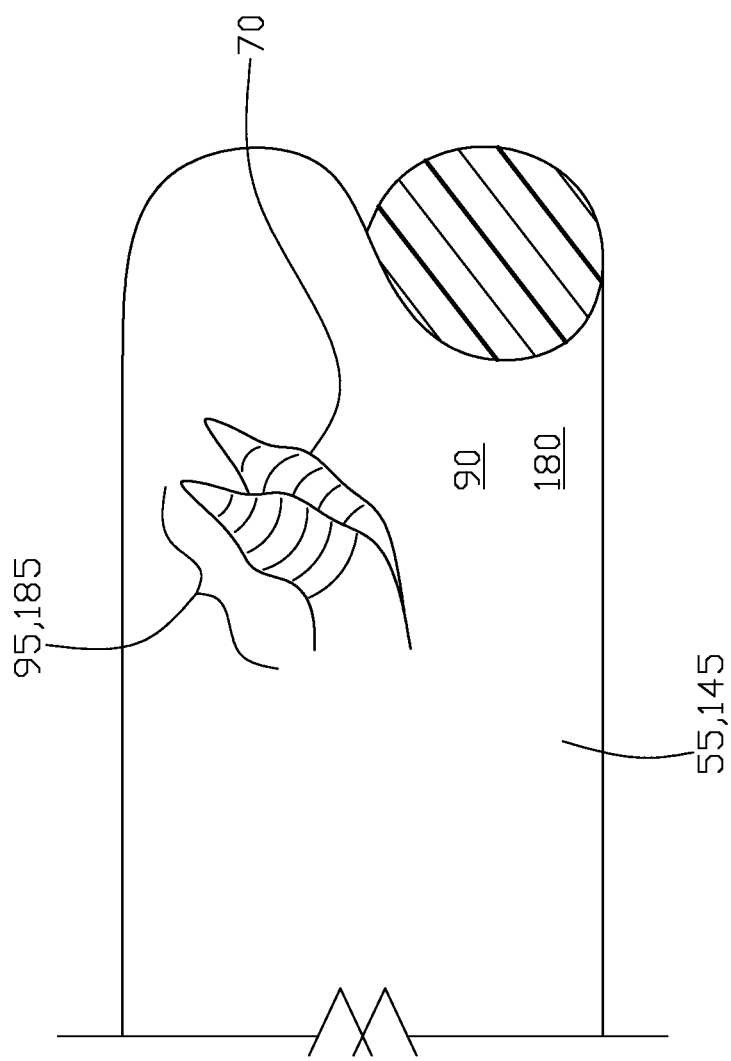
FIG. 14 shows a close-up of the first and second line outer surface having cutting/gouging damage that can result in line breakage and failure, this is what the smooth rounded corners of the helical coil spaces help to prevent.

Continuing, FIG. 13 shows the selected knot 240 separated from the line knot tying apparatus 50 via the first 55 and second 145 lines cantilever portions 75, 165 being removed from between the housing 250 and the expanded section 340, with the first 55 and second 145 lines free end portions 65, 155 being trimmed 245 resulting in an outer profile 570 for the selected knot 240 that is relatively smooth. Next, FIG. 14 shows a close-up of the first 55 and second 145 line outer surface 90, 180 having cutting/gouging damage 95, 185 that can result in line 55, 145 breakage and failure, this is what the smooth rounded corners 410 of the helical coil spaces 395 help to prevent.

Figure 15:
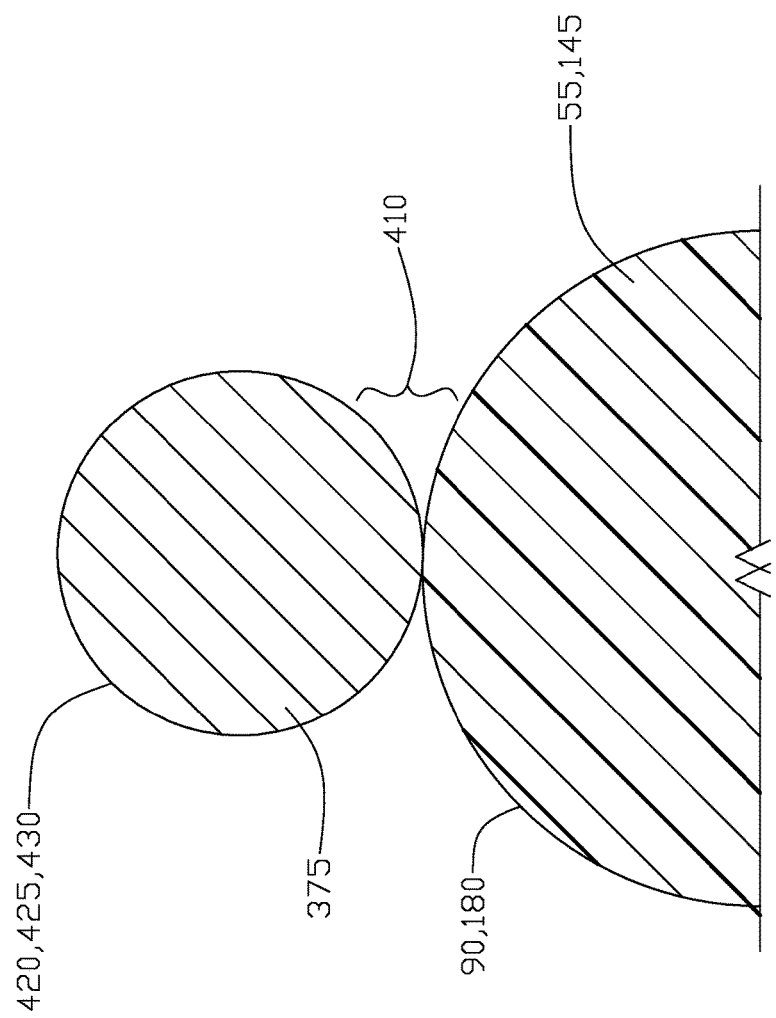
FIG. 15 is cross section 15-15 from FIG. 6 that shows in detail the cross sectional interface as between the first and second lines and the smooth and curved space entrances of the helical coil that are operational to minimize any damage to the first and second lines outer surfaces resulting in minimizing the opportunity for line failure or breakage from outer surface damage.
Figure 16:
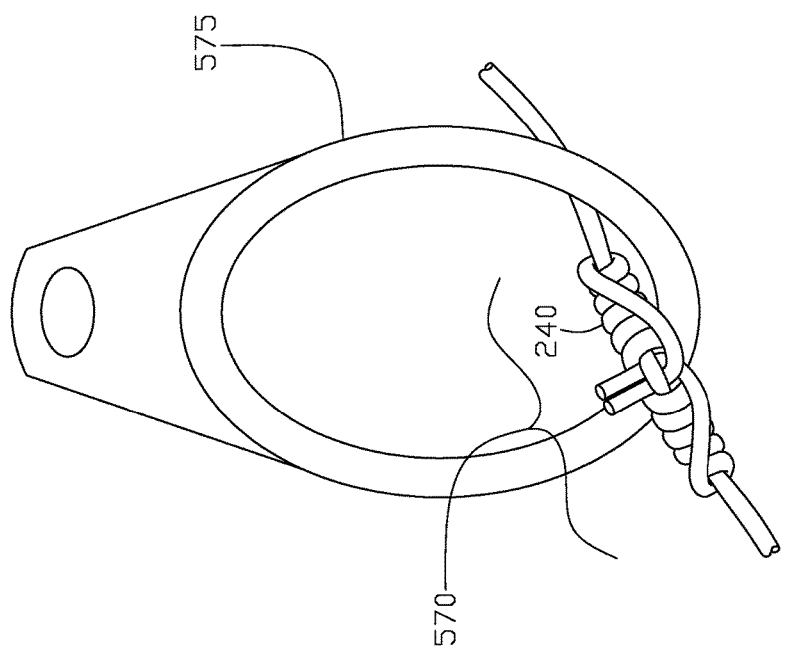
FIG. 16 shows the benefit of the smooth outer surface of the selected knot in being draw through an eyelet as in a fishing pole application.

Further, FIG. 15 is cross section 15-15 from FIG. 6 that shows in detail the cross sectional interface as between the first 55 and second 145 lines and the smooth and curved space entrances 410 of the helical coil 375 that are operational to minimize any damage 95, 185 to the first 55 and second 145 lines outer surfaces 90, 180 resulting in minimizing the opportunity for line 55, 145 failure or breakage from outer surface damage 95, 185. Next, FIG. 16 shows the benefit of the smooth outer surface 570 of the selected knot 240 in being drawn through an eyelet 575 as in a fishing pole application.

Broadly in referring to FIGS. 1 to 13, the line knot tying apparatus 50 is disclosed that assists in joining two separate line 55, 145 free ends 65, 155 that are defined as a first line 55 free end portion 65 and a second line 145 free end portion 155, wherein the tying apparatus 50 assists in joining the first 55 and second 145 line free end portions 65, 155 in a selected knot 240, as best shown in FIGS. 11 to 13.

The knot tying apparatus 50 includes the housing 250 having a longitudinal axis 255 disposed within a first plane 260 and a perpendicularly positioned 270 lateral axis 265 also disposed within the first plane 260, further the housing 250 has a side long axis 275 positioned perpendicular 280 to the first plane 260, the longitudinal axis 255 and the lateral axis 265 intersect 285 one another within the first plane 260 at a first juncture 290, wherein the side long axis 275 further intersects at the first juncture 290, see FIGS. 1, 4, 5, and 6. Also an aperture 295 is disposed therethrough the housing 250, the aperture 295 having an aperture axis 300, the aperture axis 300 being positioned parallel 305 to the longitudinal axis 255, as best shown in FIG. 4.

Also included in the knot tying apparatus 50 is an extension element 325 that is disposed within the aperture 295, the extension element 325 is slidably engaged 330 to the aperture 95, the extension element 325 protrudes 335 in an expanded section 340 beyond the housing 250 in the form of a cantilever 345, the expanded section 340 forms a removably engagable clamp 350 with the housing 250, see FIGS. 3, 4, 6, and 7. Further, a means for biasing 355 the expanded section 340 as against the housing 250 creating a default clamp closed state 360 for the extension element 325 from a clamp open state 365 with a gap 370 at the extension element 325 when the expanded section 340 is not against the housing 250 forming a gap 350 as between the housing 250 and the expanded section 340 see FIGS. 4 and 7. The means for biasing 355 is preferably a spring, however, other suitable alternative would be acceptable. Although the FIGS. 1 to 13 show a pair of extension elements 325 and accompanying apertures 295, and means for biasing 355, a single one of the extension elements 325, apertures 295, and means for biasing 355 in the housing 250 could be operational as well for the line knot tying apparatus 50.

In addition, included in the knot tying apparatus 50 is a helical coil 375 wound with continuously increasing pitch line 380 distance 390 in a cantilever manner 405 wherein the continuously increasing pitch line distance 390 forms a plurality of continuously increasing spring loaded spaces 395 positioned as between the coils resulting in smooth curved 410 space entrances and exits with the helical coil 375 being attached to the housing 250, see FIGS. 1, 4, 6, and 8 to 11. Wherein operationally the first line 55 free end portion 65 and the second line 145 free end portion 155 each have a manual removable slidable engagement 70, 160 to the plurality of spaces 395 being size selected 400 to be an appropriate space 395 based on a line diameter 60, 150, wherein the smooth rounded spaces 410 help ensure against line 55, 145 outer surface 90, 180 damage 95, 185 during the line 55, 145 removable slidable engagement 70, 160 to the helical coil 375, see in particular FIGS. 6 and 15. The helical coil 375 could be operational with either a single cantilever 405 continuously increasing pitch lines spaces 390 and spaces 395 or a pair of cantilever 405 sections that sandwich a constant pitch line distance section 440.

Further operationally the first 55 and second 145 line free end portions 65, 155 project in a cantilever manner 75, 165 beyond the helical coil 375 at a selected distance 80, 170 in opposite directions, continuing operationally the first line 55 free end portion 65 is manually wound 100 around a non-cantilever portion 175 of the second line 145 and then repeated in a plurality of first loops 110 wherein the first line 55 free end portion 65 is then secured 115 between the housing 250 and the expanded section 340 via the clamp 350, see FIGS. 8 to 10. Next the second line 145 free end portion 155 is manually wound 190 around a non-cantilever portion 85 of the first line 55 and then repeated in a plurality of second loops 200 wherein the second line 145 free end portion 155 is secured 205 between the housing 250 and the expanded section 340 via the clamp 350, see FIGS. 9 and 11. Wherein the first 55 and second 145 line free end portions 65, 155 are each manually removed 120, 210 from the plurality of spaces 395, see FIGS. 11 and 12. Further operationally the first 55 and second 145 lines non-cantilever portions 85, 175 are manually pulled apart 125, 130, 215, 220 from one another to draw the plurality of first 110 and second 200 loops tight, see FIGS. 11 and 12. Wherein the first 55 and second 145 lines cantilever portions 75, 165 are then unsecured 140, 230 and removed from between the housing 250 and the expanded section 340 at the clamp 350, moving the clamp 350 from the clamp 350 closed state 360 to the clamp open state 365, resulting in formation 235 of the knot 240 securing the first 55 and second 145 lines free end portions 65, 155 together as best shown in FIGS. 12 and 13.

As an option on the line knot tying apparatus 50, the helical coil 375 has a continuous cross section 420 that is circular 425 having a smooth polished outside surface 430 being preferably about a twelve micro-inch root mean squared surface finish, to operationally minimize damage 95, 185 to the outer surface 90, 180 of the first 55 or second 145 line from the removable slidable engagement 70, 160 of the first 55 or second 145 line free end portions 65, 155 to a selected space 395 in the helical coil 375, see FIG. 15 in particular and FIGS. 6, 8 to 11, and 14.

A further option on the line knot tying apparatus 50, the helical coil 375 attachment 415 to the housing 250 is constructed of an opening 310 therethrough the housing 250, wherein the opening has a length axis 315 that is positioned parallel 320 to the side long axis 275, wherein the helical coil 375 is disposed within the opening 310, see FIG. 6 in particular, and FIGS. 1, 4, and 5.

A continuing option for the line knot tying apparatus 50, concerns the helical coil 375 that can further comprise a section 440 that has a constant pitch line distance 435, wherein the constant pitch line distance section 440 is disposed within the opening 310, wherein the opening 310 is sized and configured 475 to matingly receive an outer surface 445 of the constant pitch line distance section 440 forming a threaded interface 505 as between the opening 310 and the outer surface 445 of the constant pitch line distance 460, see FIG. 6 in particular and also FIG. 5.

Another option, for the line knot tying apparatus 50, wherein the helical coil 375 further comprises an additional continuously increasing pitch line distance section 400, wherein the constant pitch line distance section 440 is disposed between a pair of continuously increasing pitch line distance sections 400, wherein operationally the pair of continuously increasing pitch line distance sections 400 act to keep the constant pitch line distance section 440 disposed within the opening 310 resisting movement 510 of the helical coil 375 about and along the length axis 315, see FIG. 1 in particular and FIG. 6, further operationally the pair of continuously increasing pitch sections 400 each receive one of the first line 55 free end portion 65 or the second line 145 free end portion 155, see also in particular FIG. 6 and FIGS. 9 to 11.

Yet a further option for the line knot tying apparatus 50, wherein the opening 310 that is sized and configured 475 to matingly receive the outer surface 445 of the constant pitch line distance 435 section 440 forming the threaded interface 505 is constructed of an internal thread 480 wherein the internal thread 480 has a minor diameter 485 that is less than an outside diameter 450 of the constant pitch line distance section 440, further the internal thread 480 has a major diameter 495 that is greater than the outside diameter 450 of the constant pitch line distance 435 section 440, and the internal thread 480 having a pitch diameter 490 that has a pitch distance 500 of the internal thread 480 that is greater than a pitch distance 460 of the constant pitch line distance section 440, see in particular FIG. 6, plus FIGS. 1 and 5. Thus operationally, this allows for free rotation 465 of the helical coil 375 about the length axis 315 within the internal thread 480 to provide for easier first 55 and second 145 line free end portion 65, 155 for the removable slidable engagements 70, 160 to the selected spaces 395 of the helical coil 375 while retaining 510 the helical coil 375 within the opening 310 along the length axis 315, said lateral axis 265, and the longitudinal axis 255, see FIG. 6, also FIGS. 1, and 8 to 11.

Method of Use

Looking at FIG. 6 and FIGS. 8 to 13, a method is disclosed for joining a first line 55 free end portion 65 and a second line 145 free end portion 155 in the selected knot 240 that is assisted with the knot tying apparatus 50, comprising the steps of firstly providing the knot tying apparatus 50 as previously described and a second step of providing the first line 55 free end portion 65 and the second line 145 free end portion 155 also as previously described.

Next, a third step of engaging 515 in a manual slidable manner 70, 160 the first line 55 free end portion 65 and the second line 145 free end portion 155 to each to one of the plurality of spaces 395 being size selected 580, 585 to be an appropriate space 590, 595 based on a first line diameter 60 and a second line diameter 150, wherein the smooth rounded spaces 410 help ensure against line outer surface damage 95, 185 during the line 55, 145 removable slidable engagement 70, 160 to the helical coil 375, see FIG. 6 in particular and FIGS. 8 and 9.

Subsequently, a fourth step of positioning 520 the first 65 and second 155 line free end portions to each axially project in a cantilever manner 75, 165 beyond the helical coil 375 at a selected distance 80, 170 in opposite directions to one another creating a first line 55 free end portion 65 and an opposing second line 145 free end portion 155, see FIGS. 6, 8, and 9.

Further a fifth step of winding manually 525 the first line 55 free end portion 65 around a non-cantilever portion 175 of the second line 145 and then repeating in a plurality of first loops 110, as best shown in FIG. 10.

Continuing, a sixth step of securing 535 the first line 55 free end portion 65 between the housing 250 and the expanded section 340 via the clamp 350 by pushing the extension element 325 against the bias 355 to go from the closed state 360 to the open state 365 and placing the first line 55 free end portion 65 between the housing 250 and the expanded section 340 and then releasing the extension element 325 to allow the open state 365 to go to the closed state 360 via the bias 355, see FIGS. 10 and 11.

Next, a seventh step of winding manually 540 the second line 145 free end portion 155 around a non-cantilever portion 85 of the first line 55 and then repeating in a plurality of second loops 200, see in particular FIG. 11.

Yet, further an eighth step of securing 545 the second line 145 free end portion 155 between the housing 250 and the expanded section 340 via the clamp 350 by pushing the extension element 325 against the bias 355 to go from the closed state 360 to the open state 365 and placing the second line 145 free end portion 155 between the housing 250 and the expanded section 340 and then releasing the extension element 325 to allow the open state 365 to go to the closed state 360 via the bias 355, see FIG. 11.

Continuing, a ninth step of removing manually 550 the first 65 and second 155 line free end portions 65, 155 from the plurality of spaces 395, see FIG. 11 going to FIG. 12.

Moving onward, a tenth step of pulling manually 555 apart the first 85 and second 175 lines non-cantilever portions from one another to draw the plurality of first 110 and second 200 loops tight, as best shown in going from FIGS. 11 to 12.

Next, an eleventh step of removing manually 560 the first 135 and second 225 lines cantilever portions that are unsecured from the knot tying apparatus 50 via pulling the first 135 and second 225 lines cantilever unsecured portions from between the housing 250 and the expanded section 340 at the clamp 350, resulting in the formation 235 of the selected knot 240 securing the first 65 and second 155 lines free end portions together, in going from FIGS. 12 to 13.

As an option for the method for joining the first line 55 free end portion 65 and the second line 145 free end portion 155 in the selected knot 240 wherein the winding manually 525, 540 steps further have the first loops 110 and the second loops 200 wound in opposing rotational directions 565 to one another about the non-cantilever portion 175 of the second line 145 and the non-cantilever portion 85 of the first line 55 respectively to further smooth an outer profile 570 of the selected knot 240 for easier sliding of the selected knot 240 through eyelets 575, see in particular FIG. 11 and then FIG. 16. In other words the plurality of loops 110 have a wound direction 105 as shown in FIG. 10 and the plurality of loops 200 have a wound direction 195 as shown in FIG. 11.

Another option for the method for joining a first line free 55 end portion 65 and a second line 145 free end portion 155 in the selected knot 240 wherein the step of engaging 515 in a manual slidable manner further includes a step of sorting the first line 55 free end portion 65 and the second line 145 free end portion 155 into a smaller first line diameter 580 and a larger second line diameter 585, wherein the smaller first line diameter 580 is slidably engaged 70 to a smaller space 590 from the plurality of spaces 395 and the larger second line diameter 585 is slidably engaged 160 to a larger space 595 from the plurality of spaces 395, see in particular FIG. 6, to operationally engage the smaller first line diameter 580 and the larger second line diameter 585 to the helical coil 375 and helping to reduce first 95 and second 185 line outer surface damage, see also FIG. 14 and FIGS. 8 to 11.

The invention claimed is:

1. A line knot tying apparatus that assists in joining two separate line free ends that are defined as a first line free end portion and a second line free end portion, said tying apparatus assists in joining the first and second line free end portions in a selected knot, comprising:
    (a) a housing having a longitudinal axis disposed within a first plane and a perpendicularly positioned lateral axis also disposed within said first plane, further said housing has a side long axis positioned perpendicular to said first plane, said longitudinal axis and said lateral axis intersect one another within said first plane at a first juncture, wherein said side long axis further intersects at said first juncture;
    (b) an aperture disposed therethrough said housing, said aperture having an aperture axis, said aperture axis being positioned parallel to said longitudinal axis;
    (c) an extension element that is disposed within said aperture, said extension element is slidably engaged to said aperture, said extension element protrudes in an expanded section beyond said housing in the form of a cantilever, said expanded section forms a removably engagable clamp with said housing;
    (d) a means for biasing said expanded section as against said housing creating a clamp closed state for said extension element from a clamp open state at said extension element when said expanded section is not against said housing forming a gap as between said housing and said expanded section; and
    (e) a helical coil wound with continuously increasing pitch line distance in a cantilever manner wherein said continuously increasing pitch line distance forms a plurality of continuously increasing spring loaded spaces positioned as between said coils resulting in smooth curved space entrances and exits, said helical coil is attached to said housing, wherein operationally the first line free end portion and the second line free end portion each have a manual removable slidable engagement to said plurality of spaces being size selected to be an appropriate space based on a line diameter, wherein said smooth rounded spaces help ensure against line outer surface damage during the line removable slidable engagement to said coil, further operationally the first and second line free end portions project in a cantilever manner beyond said coil at a selected distance in opposite directions, continuing operationally the first line free end portion is manually wound around a non-cantilever portion of the second line and then repeated in a plurality of first loops wherein the first line free end portion is then secured between said housing and said expanded section via said clamp, next the second line free end portion is manually wound around a non-cantilever portion of the first line and then repeated in a plurality of second loops wherein the second line free end portion is secured between said housing and said expanded section via said clamp, wherein the first and second line free end portions are each manually removed from said plurality of spaces, further operationally the first and second lines non-cantilever portions are manually pulled apart from one another to draw the plurality of first and second loops tight, wherein the first and second lines cantilever portions are then unsecured and removed from between said housing and said expanded section at said clamp, moving said clamp from said clamp closed state to said clamp open state, resulting in the knot securing the first and second lines free end portions together.

2. A line knot tying apparatus according to claim 1 wherein said helical coil has a continuous cross section that is circular having a smooth outside surface to operationally minimize damage to the outer surface of the first or second line from said removable slidable engagement of the first or second line free end portion to a selected space in said helical coil.

3. A line knot tying apparatus according to claim 1 wherein said helical coil attachment to said housing is constructed of an opening therethrough said housing, wherein said opening has a length axis that is positioned parallel to said side long axis, said helical coil is disposed within said opening.

4. A line knot tying apparatus according to claim 3 wherein said helical coil further comprises a section that has a constant pitch line distance, wherein said constant pitch line distance section is disposed within said opening, said opening is sized and configured to matingly receive an outer surface of said constant pitch line distance section forming a threaded interface as between said opening and said outer surface of said constant pitch line distance.

5. A line knot tying apparatus according to claim 4 wherein said helical coil further comprises an additional continuously increasing pitch line distance section, wherein said constant pitch line distance section is disposed between said pair of continuously increasing pitch line distance sections, wherein operationally said pair of continuously increasing pitch line distance sections act to keep said constant pitch line distance section disposed within said opening resisting movement of said helical coil about and along said length axis, further operationally said pair of continuously increasing pitch sections each receive one of the first line free end portion or the second line free end portion.

6. A line knot tying apparatus according to claim 5 wherein said opening that is sized and configured to matingly receive said outer surface of said constant pitch line distance section forming said threaded interface is constructed of an internal thread wherein said internal thread has a minor diameter that is less than an outside diameter of said constant pitch line distance section, further said internal thread has a major diameter that is greater than said outside diameter of said constant pitch line distance section, and said internal thread having a pitch diameter that has a pitch distance of said internal thread that is greater than a pitch distance of said constant pitch line distance section, thus operationally this allows for free rotation of said helical coil about said length axis within said internal thread to provide for positioning first and second line free end portion in said removable slidable engagement to said selected spaces of said helical coil while retaining said helical coil within said opening along said length axis, said lateral axis, and said longitudinal axis.

7. A method for joining a first line free end portion and a second line free end portion in a selected knot that is assisted with a knot tying apparatus, comprising the steps of:
    (a) providing said knot tying apparatus that includes a housing having a longitudinal axis disposed within a first plane and a perpendicularly positioned lateral axis also disposed within said first plane, further said housing has a side long axis positioned perpendicular to said first plane, said longitudinal axis and said lateral axis intersect one another within said first plane at a first juncture, wherein said side long axis further intersects at said first juncture, further included in said knot tying apparatus is an aperture disposed therethrough said housing, said aperture having an aperture axis, said aperture axis being positioned parallel to said longitudinal axis, also included in said knot tying apparatus is an extension element that is disposed within said aperture, said extension element is slidably engaged to said aperture, said extension element protrudes in an expanded section beyond said housing in the form of a cantilever, said expanded section forms a removably engagable clamp with said housing, in addition said knot tying apparatus includes a means for biasing said expanded section as against said housing creating a clamp closed state for said extension element from a clamp open state at said extension element when said expanded section is not against said housing forming a gap as between said housing and said expanded section, and a helical coil wound with continuously increasing pitch line distance in a cantilever manner wherein said continuously increasing pitch line distance forms a plurality of continuously increasing spring loaded spaces positioned as between said coils resulting in smooth curved space entrances and exits, said helical coil is attached to said housing;

(b) providing the first line free end portion and the second line free end portion;

(c) engaging in a manual slidable manner the first line free end portion and the second line free end portion each to one of said plurality of spaces being size selected to be an appropriate space based on a first line diameter and a second line diameter, wherein said smooth rounded spaces help ensure against line outer surface damage during the line removable slidable engagement to said coil;

(d) positioning the first and second line free end portions to each axially project in a cantilever manner beyond said coil at a selected distance in opposite directions creating a first line free end portion and an opposing second line free end portion;

(e) winding manually the first line free end portion around a non-cantilever portion of the second line and then repeating in a plurality of first loops;

(f) securing the first line free end portion between said housing and said expanded section via said clamp by pushing said extension element against said bias to go from said closed state to said open state and placing the first line free end portion between said housing and said expanded section and then releasing said extension element to allow said open state to go to said closed state via said bias;

(g) winding manually the second line free end portion around a non-cantilever portion of the first line and then repeating in a plurality of second loops;

(h) securing the second line free end portion between said housing and said expanded section via the clamp by pushing said extension element against the bias to go from said closed state to said open state and placing the second line free end portion between said housing and said expanded section and then releasing said extension element to allow said open state to go to said closed state via said bias;

(i) removing manually the first and second line free end portions from said plurality of spaces;

(j) pulling manually apart the first and second lines non-cantilever portions from one another to draw the plurality of first and second loops tight; and (k) removing manually the first and second lines cantilever portions that are unsecured from said knot tying apparatus via pulling the first and second lines cantilever unsecured portions from between said housing and said expanded section at said clamp, resulting in the selected knot securing the first and second lines free end portions together.

8. A method for joining a first line free end portion and a second line free end portion in a selected knot according to claim 7 wherein said winding manually steps further have said first loops and said second loops wound in opposing rotational directions to one another about the non-cantilever portion of the second line and the non-cantilever portion of the first line respectively to further smooth an outer profile of the selected knot for osier minimal hang up of sliding of the selected knot through eyelets.

9. A method for joining a first line free end portion and a second line free end portion in a selected knot according to claim 7 wherein said step of engaging in a manual slidable manner further includes a step of sorting the first line free end portion and the second line free end portion into a smaller first line diameter and a larger second line diameter, wherein the smaller first line diameter is slidably engaged to a smaller space from said plurality of spaces and the larger second line diameter is slidably engaged to a larger space from said plurality of spaces, to operationally engage the smaller first line diameter and the larger second line diameter to said helical coil and helping to reduce first and second line outer surface damage.

* * * * *